(12) United States Patent
Wilkins, Jr. et al.

(10) Patent No.: US 7,945,356 B2
(45) Date of Patent: May 17, 2011

(54) PORTABLE AUTONOMOUS TERMINAL GUIDANCE SYSTEM

(75) Inventors: Robert R. Wilkins, Jr., Wilmington, DE (US); Daniel I. Newman, Lafayette Hill, PA (US)

(73) Assignee: The BOEING Company, Chicago, IL (US)

( * ) Notice: Subject to any disclaimer, the term of this patent is extended or adjusted under 35 U.S.C. 154(b) by 784 days.

(21) Appl. No.: 11/772,072

(22) Filed: Jun. 29, 2007

(65) Prior Publication Data

US 2009/0005921 A1    Jan. 1, 2009

(51) Int. Cl.
*B64D 45/04* (2006.01)
*B64F 1/18* (2006.01)
*G01S 19/15* (2010.01)

(52) U.S. Cl. .............................. 701/18; 701/17; 340/950
(58) Field of Classification Search ...................... 701/18
See application file for complete search history.

(56) References Cited

U.S. PATENT DOCUMENTS

| | | | |
|---|---|---|---|
| 4,318,076 A | 3/1982 | Whitfield | |
| 5,252,978 A | 10/1993 | Priestley | |
| 5,265,024 A | 11/1993 | Crabill | |
| 5,702,070 A | 12/1997 | Waid | |
| 6,356,228 B1 | 3/2002 | Tomita | |
| 7,082,382 B1 * | 7/2006 | Rose et al. | 702/183 |
| 7,200,491 B1 * | 4/2007 | Rose et al. | 702/3 |
| 7,257,469 B1 * | 8/2007 | Pemble | 701/3 |
| 2005/0182530 A1 | 8/2005 | Murphy | |
| 2008/0019299 A1 * | 1/2008 | Lekutai et al. | 370/328 |
| 2008/0039988 A1 * | 2/2008 | Estabrook et al. | 701/14 |
| 2008/0231473 A1 * | 9/2008 | Wyatt et al. | 340/971 |
| 2008/0309518 A1 * | 12/2008 | Aung | 340/979 |
| 2010/0017105 A1 * | 1/2010 | Pepitone et al. | 701/120 |
| 2010/0017127 A1 * | 1/2010 | Pepitone et al. | 701/301 |

* cited by examiner

*Primary Examiner* — Thomas G Black
*Assistant Examiner* — Shelley Chen
(74) *Attorney, Agent, or Firm* — Brosemer, Kolefas & Associates

(57) ABSTRACT

A portable autonomous terminal guidance system can be located in an aircraft landing zone. The terminal guidance system generates a signal indicative of the position, the terrain, and the meteorological conditions where the guidance system is located. A receiving aircraft may process the signal produced by the terminal guidance system to generate a self-contained GPS obstacle-avoidance approach path for the aircraft to the landing zone.

18 Claims, 3 Drawing Sheets

1

PORTABLE AUTONOMOUS TERMINAL GUIDANCE SYSTEM

TECHNICAL FIELD

This disclosure relates to aircraft guidance systems. More particularly, this disclosure relates to portable autonomous terminal guidance systems useful in covert military applications and civilian emergency and law enforcement operations, and the like.

BACKGROUND

There are many situations where it is desirable to provide guidance for an aircraft into and out of an unprepared area without an established airfield. For example, it would be desirable to insert assault troops to and from a remote battlefield. Another example would be emergency medical services operations used to evacuate and transport severe trauma accident victims or other individuals in need of medical attention by air to the nearest hospital. In all cases, there is a need to safely guide an aircraft such as a helicopter to an appropriate landing zone where there is no established airfield. In this regard, a detailed and comprehensive understanding of the relevant conditions in a potential landing zone is crucial to safely landing the aircraft and subsequently taking off.

In non-military situations, only visual acquisition of the landing area by the crew of the aircraft in good visual meteorological conditions is possible. In secure military situations, the on-the-ground armed forces may employ a glide angle indicator light (GAIL) apparatus to assist in guiding an aircraft to a safe landing in a confined area. There are significant limitations to these approaches, however. Visual terminal guidance is not possible in poor weather (very low visibility) conditions. GAIL systems are limited to night time operations in good weather conditions and they are difficult to install.

SUMMARY

The problems outlined above are solved by a small, integrated system that provides an on-demand recommended approach path direction and angle to a remote unsurveyed and unprepared landing site to an overhead aircraft. In certain embodiments of the disclosure, the system transmits its dGPS position, local weather (temperature, ceiling and visibility), sensor-generated circular obstruction height and recommended approach path direction and minimum approach angle on demand to provide a self-contained approach guidance to a remote unsurveyed and unprepared landing site under instrument meteorological conditions (IMC), for example, a cloud ceiling less than 1000 feet above ground level and visibility less than 3 statute miles.

In one specific embodiment of the disclosure, a portable terminal guidance system comprises a global positioning system transceiver that produces an output signal representing the location of the terminal guidance system. A terrain scanner is adapted to produce an output signal relating to the characteristics of the terrain in the vicinity of the terminal guidance system. A ceilometer is adapted to produce an output signal relating to the surface visibility and the cloud cover base in the vicinity of the terminal guidance system. A processor or computer is responsive to the radio, the terrain scanner, and the ceilometer to produce a data signal capable of being processed by a receiving aircraft into an obstacle avoidance approach path, generating an on-demand terminal approach for the receiving aircraft.

In another embodiment of the disclosure, a portable guidance system like the one just described is placed in a remote landing zone along with a landing light system to provide an approach path for an aircraft to the landing zone.

The features, functions, and advantages that are discussed herein can be achieved independently in various embodiments of the present disclosure or may be combined in yet other embodiments further details of which can be seen with reference to the following description and drawings.

DETAILED DESCRIPTION

Figure 1:
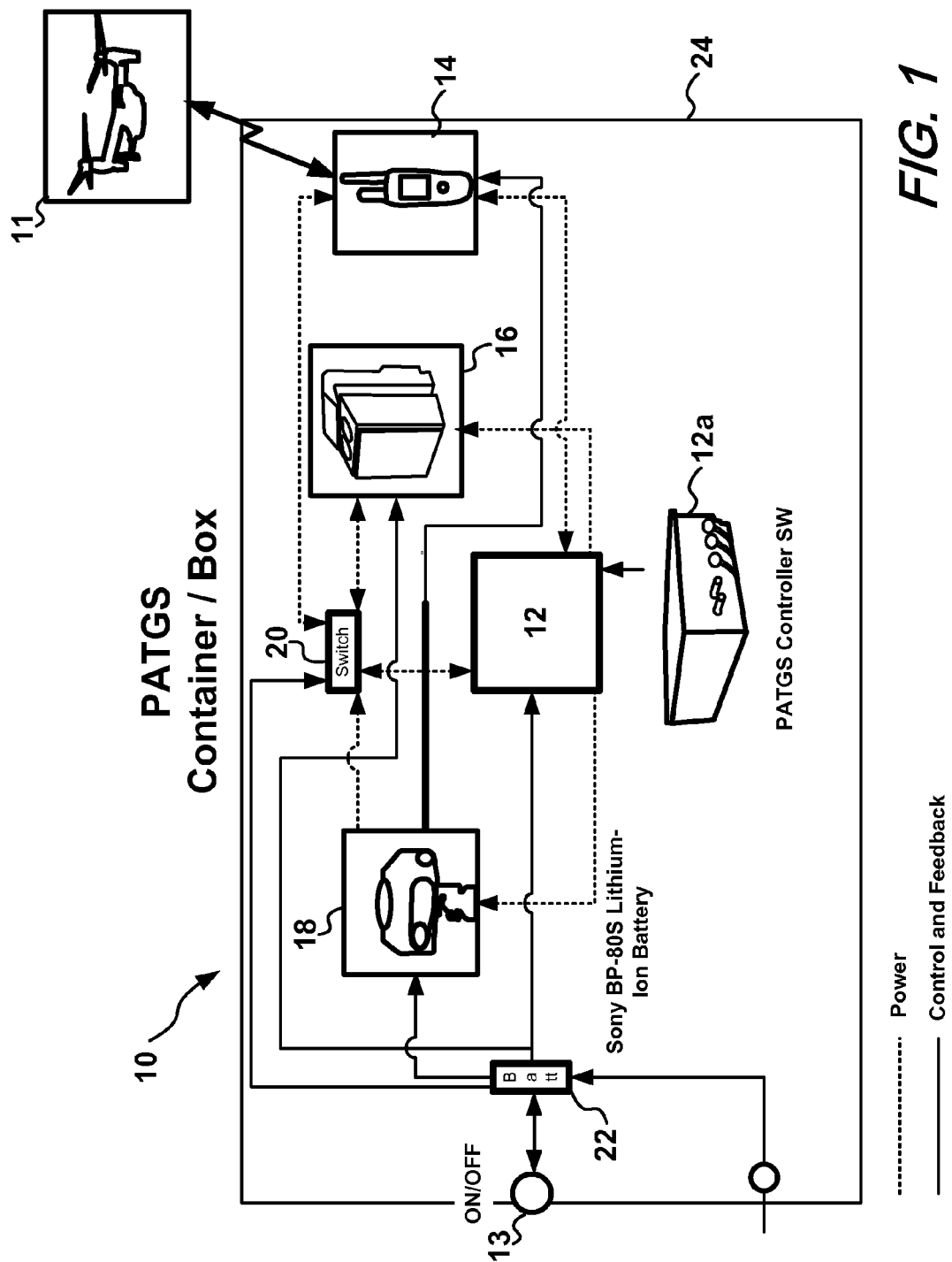
FIG. 1 is a schematic block diagram of one embodiment of the disclosure.

Portable autonomous terminal guidance systems in accordance with this disclosure meet the requirements of the US Department of Defense, US Department of Homeland Security, Emergency Medical Services, and Law Enforcement for a man-portable system that can provide an all-weather, day/night precision landing capability in remote areas not served by existing airfields. Terminal guidance systems in accordance with the disclosure may be based on differential Global Positioning System (dGPS) technology and laser technology to provide information about the location of the terminal guidance system on the ground and the conditions at the site that would assist an incoming aircraft to make a safe and precise landing in the vicinity of the terminal guidance system. Terminal guidance systems in accordance with this disclosure also may provide on-demand secure burst data transmission, including the ability to operate in a jamming environment. Terminal guidance systems in accordance with this disclosure also may provide an autonomous survey of an unprepared landing zone or site. The system is capable of providing dGPS positional accuracy to less than 1 meter, a determination of the highest obstacles and the corresponding required approach angle, the best landing axis, and the ceiling and visibility and surface winds resulting in an all-weather, day/night precision landing capability.

A terminal guidance system in accordance with the disclosure can be placed in the field or carried to a desired site. It can be placed early, or at the time needed, as conditions require. It can remain dormant until interrogated, and then it can activate and provide required data to a requesting party or turned on for immediate use. The system can be positioned in clandestine operations, set for a dwell period and timed for automatic activation to provide "first time" all-weather terminal guidance for assault wave airborne assets The device will be self contained and internally powered. The device is placed in situ and armed. When required, the device in a dwell mode is interrogated by coded signal transmitted by an aircraft overhead. The device activates a computer or other processor, which commands a GPS transmitter to determine the dGPS position of the apparatus. A high resolution detailed terrain database, preferably DTED 2 or better, is embedded in the computer's software. The GPS transmitter will determine its position to within 1 meter. Concurrently, the computer commands the 3D Laser terrain scanner to extend and complete a 360° scan, determining obstacle height, distance and azimuth from device. This data is plotted on the terrain data and the lowest obstacle approach path is calculated. The computer concurrently commands a ceilometer to measure vertical cloud base and surface visibility. All of the data is gathered and the computer commands the transmitter system to broadcast a discrete burst signal providing all of the data to the receiver aircraft, which processes the data to generate a self-contained GPS obstacle-avoidance approach path to the device/site. After a predetermined sequence, computer commands system to OFF and returns the device to the dwell mode awaiting further commands. If the terminal guidance system is being used in a secure environment, a landing light system and/or a glide slope indicator light system, for example, the military's glide angle indicator light (GAIL) system, can be used to supplement the operation of the terminal guidance system.

The Embodiment of FIG. 1

FIG. 1 shows the main functional elements of one example of a terminal guidance system 10 in accordance with this disclosure. The terminal guidance system 10 is portable and can be placed in a potential landing zone for an aircraft 11. The landing zone may be located in an area that has no airfield or other prepared area where aircraft can land. Typically, the terminal guidance system 10 would be useful in military assault, evacuation, and rescue operations and the like. It would also be useful for civilian emergency medical evacuations and law enforcement operations and the like.

The terminal guidance system 10 of FIG. 1 includes a processor or computer 12 which coordinates and manages the elements and functions of the terminal guidance system 10. The computer 12 is programmed with a body of application specific software 12a that implements the operations shown in FIG. 2. As part of that software 12a, the computer 12 contains a detailed terrain data base that is used in conjunction with measurements taken by the terminal guidance system 10 to map a suitable approach path for an incoming aircraft 11. The computer 12 executes the software 12a to implement the functionality shown in FIG. 2 and described in detail below.

An ON/OFF switch 13 is used to activate the terminal guidance system 10. The software 12a may maintain the terminal guidance system 10 in a dormant state after the switch 13 is turned ON until interrogated by an the inquiring source such as an aircraft 11 seeking to land in the vicinity of the terminal guidance system 10. Once the terminal guidance system 10 has been interrogated, then it is commanded by the software 12a to provide the required data to the inquiring source in response to the interrogation signal. Alternatively, the software 12a may implement a clock function that sets a timed dwell period after the switch 13 is turned ON, after which the terminal guidance system 10 is automatically activated. This capability would be useful, for example, in clandestine operations, to provide "first time" all-weather terminal guidance for assault wave airborne assets.

The computer 12 is connected to a global positioning system transceiver 14 which communicates with the Global Positioning System to produce an output signal, preferably a differential GPS (dGPS) output signal, which indicates the location of the terminal guidance system 10 to both the processor 12 and the aircraft 11. A laser ceilometer 16 is connected to the computer 12 and provides an output signal indicating the height of the cloud cover over the terminal guidance system 10 and the surface visibility in the vicinity of the terminal guidance system 10. A three dimensional laser terrain scanner 18 also is connected to the computer 12 and produces an output signal representing a three dimensional scan of the terrain in the vicinity of the guidance system 10.

The scanner 18 may indicate the height, distance, and azimuth of any obstacle, such as trees and rocks, with respect to the guidance system 10. A switch 20 routes communications signals between and among the components of the terminal guidance system 10. A battery pack 22 is a self contained power supply for the computer 12, transceiver 14, ceilometer 18, and switch 20. A rugged container 24 encloses the components of the terminal guidance system 10.

All of the elements of the terminal guidance system 10 in FIG. 1 may be commercial off the shelf items. For example, the computer 12 may be a Dell laptop computer, the GPS transceiver 14 may be a Garmin® 2-Way Radio, the ceilometer 16 may be an All-Weather Inc.® Laser Ceilometer, and the terrain scanner 18 may be a Riegl® 3D Laser Terrain Scanner. Illustratively, the battery pack 22 may be a Sony BP-80S rechargeable lithium-ion battery and the switch 20 may be any commercially available routing device that can provide the necessary functionality. The invention is not limited to any specific implementation of the componentry shown in FIG. 1. Any kind of equipment that can implement the functionality described herein may be used, including custom designed equipment.

Operation of the FIG. 1 Embodiment

Figure 2:
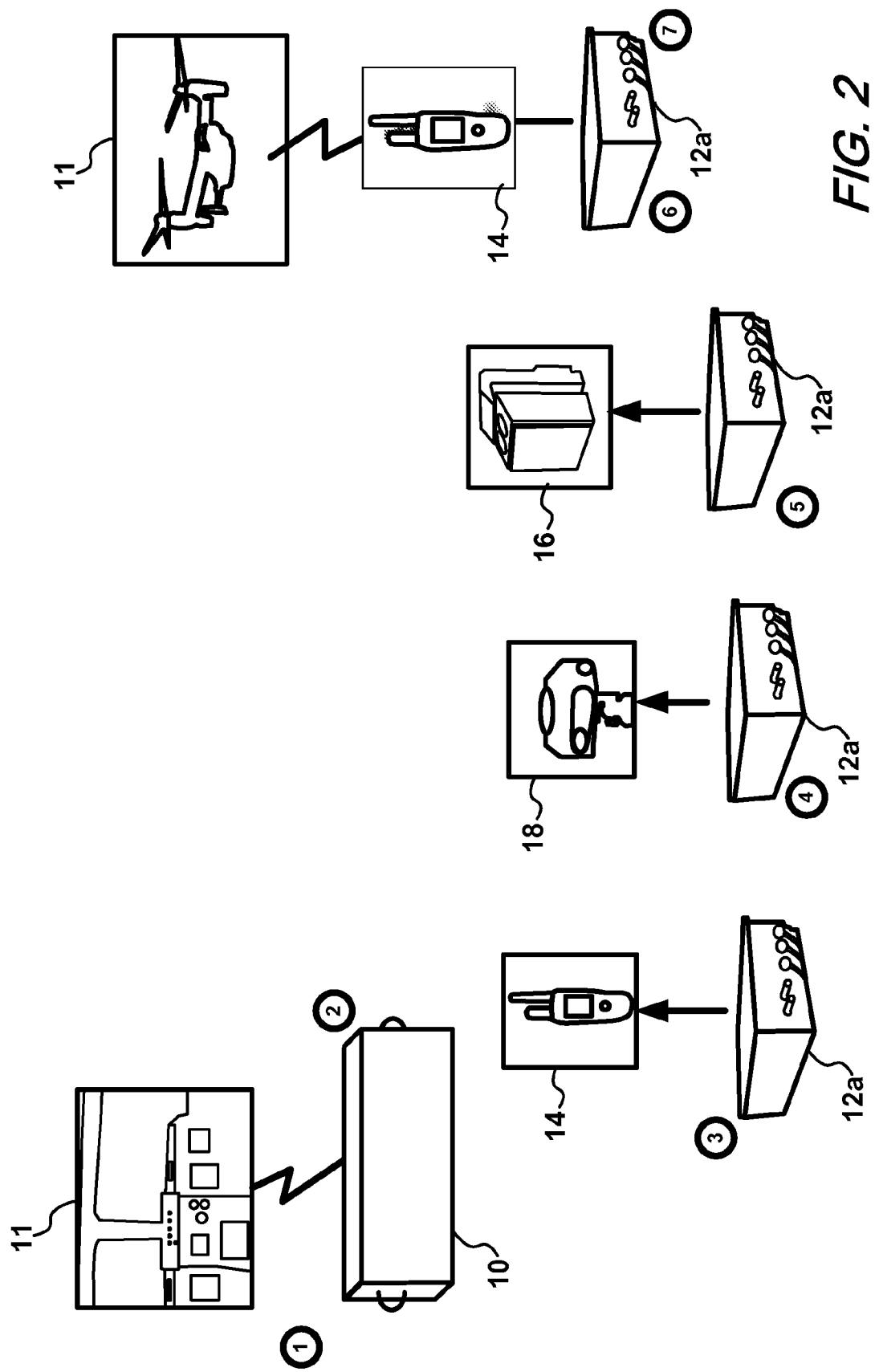
FIG. 2 is a flow chart illustrating the operation of the embodiment of FIG. 1.

As shown in FIG. 2, the portable autonomous guidance system 10 in accordance with this disclosure first is placed at the site and turned on using ON/OFF switch 13 in step 1. When required, device is interrogated by a coded communication issued by an aircraft 11 desiring to land at the site of the terminal guidance system 10 in step 2. The coded communication activates the computer 12 in the terminal guidance system 10. The software 12a in the computer 12 next commands the GPS transmitter 14 to determine the dGPS position of the terminal guidance system 10 in step 3. Once the dGPS position has been determined, the computer 12 commands the laser terrain scanner 18 in step 4 to extend and complete a 360° scan of the area where the guidance system 10 is located. The 3D laser scanner 18 determines obstacle height, distance and azimuth with respect to the guidance system. The computer 12 then commands the ceilometer 16 in step 5 to measure the vertical cloud base and surface visibility. The computer 12 then commands the GPS transceiver 14 in step 6 to broadcast a discrete signal, preferably a discrete data burst signal, to provide the pertinent data to the interrogating aircraft 11. The aircraft 11 then processes the data to generate a self-contained GPS obstacle-avoidance approach path to the site where the terminal guidance system 10 is located. After a predetermined sequence, computer 12 commands system to turn OFF and enter a dwell mode in step 7.

Figure 3:
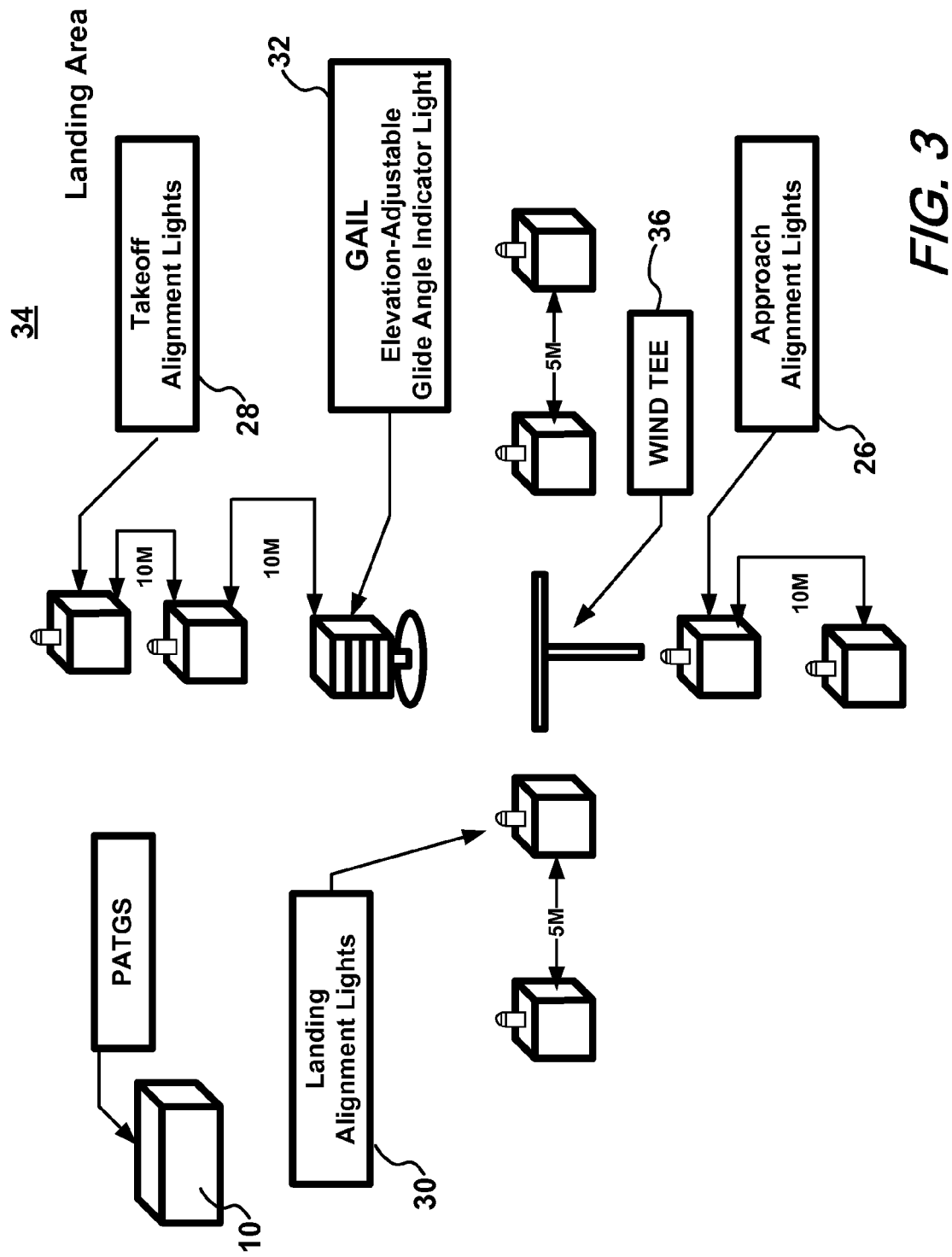
FIG. 3 shows an embodiment of the disclosure involving the use of a portable autonomous terminal guidance system in combination with a landing light system.

The Embodiment of FIG. 3

Normally, the terminal guidance system 10 is a standalone system that can be used for aircraft guidance without any additional equipment. In secure environments, however, the terminal guidance system 10 of FIG. 1 and FIG. 2 may be used with additional visual landing aids, weather and lighting conditions permitting. Use of a terminal guidance system 10 in combination with a landing light system in those circumstances provides weather penetrating approach and descent guidance and visual terminal landing guidance.

In one example of the invention shown in FIG. 3, there may be a set of landing lights included in the container 24, for example, a commercial off the shelf set of landing lights from the U.S. Marine Corps, currently in use with the military's glide angle indicator light (GAIL) landing zone lighting system. The set of lights may illustratively comprise eight yellow lights, comprising four approach/lead-in lights 26 and four takeoff alignment lights 28, and four blue landing area marker lights 30. In addition to the landing lights above, the terminal guidance system may be used with a glide angle indicator light (GAIL) box 32. The activator first will place the terminal guidance system 10 shown in FIG. 1 at the center of the non-obstructed landing area 34. The GAIL box 32 will be set up just in front of the approach yellow lights 26 placed 10 meters apart in a direct line indicating the final approach azimuth. The other take off yellow lights 28 will also be placed at ten meter intervals, this time ahead the GAIL box 32 and terminal guidance system 10 indicating the takeoff azimuth. The four blue lights 30 are placed in a row at five meter intervals parallel to the GAIL box 32 and perpendicular to the row of yellow approach and take off lights 26 and 28. These mark the desired touchdown area. A standard DoD ORANGE Wind TEE 36 may be is included for day visual flight rules (VFR) operations. Functionality of the terminal guidance system 10 is the same as in standalone embodiments, but the GAIL light system can provide a visual approach slope indicator (VASI) to the touchdown area.

ILLUSTRATIVE APPLICATION

Terminal guidance systems in accordance with this disclosure are capable of operating with all military and civilian aircraft in a wide variety of applications. They may be used by all branches of the US Military, for example, by the U.S. Marine Corps for ship-to-shore all-weather assault and assault support operations and by the U.S. Army for land-based assault and assault support operations. The U.S. Air Force and U.S. Coast Guard may use it as an air-droppable survivor location terminal guidance system. All foreign militaries may use it for the same applications as the U.S. military. All U.S. Law Enforcement Agencies (LEA) may use the system to support emergency airborne medical evacuation (AMS/EMS) requirements. U.S. Government agencies such as Department of the Interior and State agencies may use it to provide rough-terrain, unsurveyed location terminal guidance in situations such as fighting forest fires and rescue operations.

In military applications, the terminal guidance system 10 is capable of being placed early on the battlefield to provide positive control of friendly aircraft into and out of forward remote landing zones and/or operating bases operating in a Global Positioning System (GPS)-denied environment. It is capable self-surveying the area, providing elevation coverage that will support a glide path from 2° to 9° and selectable in 0.25° increments. It will also support landing minima of a 100 ft. ceiling with a 700 ft. flight visibility. It will provide detection range from 0.25 to 10 nautical miles and be capable of being set up and made operational by one person, in a time limit of 30 minutes or less. It will be battery powered and self-contained, as well as capable of being operated off of standard 60 Hz military generators or vehicle power, and will operate in a jamming or electronic attack environment without loosing significant detection capability. It will present a minimal electronic signature through low probability of intercept transmissions using Burst Data Link. It can be activated either on a timed sequence or remain in a dwell mode until discretely interrogated. When activated, it will have a scan, or update rate, of once every five seconds, or less. It shall be capable of being transported and operated from a single HWMMV or similar vehicle with no permanent modification to the vehicle.

The Title, Technical Field, Background, Summary, Brief Description of the Drawings, Detailed Description, and Abstract are meant to illustrate the preferred embodiments of the disclosure and are not in any way intended to limit the scope of the invention. The scope of the invention is solely defined and limited by the claims set forth below.

The invention claimed is:

1. A portable terminal guidance system, comprising:
  a global positioning system (GPS) transceiver adapted to produce a GPS output signal representing the location of the terminal guidance system;
  a terrain scanner adapted to produce an output signal relating to the characteristics of the terrain in the vicinity of the terminal guidance system;
  a ceilometer adapted to produce an output signal relating to the visibility and the cloud cover in the vicinity of the terminal guidance system; and
  a processor responsive to the radio, the scanner, and the ceilometer adapted to produce a data signal capable of being processed by a receiving aircraft into an obstacle avoidance approach path for the receiving aircraft.

2. The terminal guidance system of claim 1, further comprising a terrain database in the processor.

3. The terminal guidance system of claim 1, in which the global positioning system transceiver produces a differential global positioning system signal representing the location of the terminal guidance system.

4. The terminal guidance system of claim 1, in which the terrain scanner is adapted to produce an output signal relating to the height, distance, and azimuth of obstacles in the vicinity of the terminal guidance system.

5. The terminal guidance system of claim 1, in which the processor is adapted to command the GPS transceiver to produce the GPS output signal in response to an activation signal from a using asset.

6. The terminal guidance system of claim 1, further comprising:
  a landing light system.

7. The terminal guidance system of claim 6, in which the landing light system comprises a set of approach alignment lights.

8. The terminal guidance system of claim 6, in which the landing light system comprises a set of takeoff alignment lights.

9. The terminal guidance system of claim 6, in which the landing light system comprises a set of landing alignment lights.

10. The terminal guidance system of claim 6, in which the landing light system comprises an elevation adjustable glide angle indicator light.

11. The terminal guidance system of claim 6, further comprising a wind tee.

12. A method of generating an obstacle avoidance approach path to an aircraft landing zone, comprising the steps of:
  placing the portable autonomous terminal guidance system of claim 1 in a landing zone;
  interrogating the terminal guidance system;
  determining the position of the terminal guidance system;
  scanning the landing zone for obstacles;
  measuring weather conditions at the landing zone; and
  generating an obstacle avoidance approach path to the landing zone in response to the determining, scanning, and measuring steps.

13. Method of preparing an aircraft landing zone, comprising the steps of:

placing the portable autonomous terminal guidance system of claim 1 in a landing zone.

14. The method of claim 13, further comprising the step of: placing a landing light system in the landing zone.

15. A method of generating an obstacle avoidance approach path to an aircraft landing zone, comprising the steps of:
- placing the portable autonomous terminal guidance system of claim 1 in a landing zone;
- interrogating the terminal guidance system;
- determining the position of the terminal guidance system;
- scanning the landing zone for obstacles;
- measuring weather conditions at the landing zone;
- generating an obstacle avoidance approach path to the landing zone in response to the determining, scanning, and measuring steps; and
- placing a landing light system in the landing zone.

16. The terminal guidance system of claim 1 further comprising:
- a 3D laser terrain scanner adapted to measure and record terrain slope and obstacle height, distance, and azimuth with respect to the terminal guidance system.

17. The terminal guidance system of claim 1
- wherein the portable autonomous terminal guidance system is adapted to remain in a dormant state until interrogated by an inquiring source, then to activate and provide required data to the inquiring source in response to the activation signal; and
- a software timer set for a dwell period and timed for automatic activation to provide "first time" all-weather terminal guidance for assault wave airborne assets.

18. The terminal guidance system of claim 1, further comprising a terrain database.

* * * * *